US011498590B2

(12) United States Patent
Lee et al.

(10) Patent No.: US 11,498,590 B2
(45) Date of Patent: Nov. 15, 2022

(54) AUTONOMOUS DRIVING CONTROL METHOD AND DEVICE

(71) Applicants: HYUNDAI MOTOR COMPANY, Seoul (KR); KIA MOTORS CORPORATION, Seoul (KR)

(72) Inventors: Dong Hwi Lee, Seongnam-si (KR); Su Jung Yoo, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 51 days.

(21) Appl. No.: 17/008,123

(22) Filed: Aug. 31, 2020

(65) Prior Publication Data

US 2021/0339773 A1 Nov. 4, 2021

(30) Foreign Application Priority Data

Apr. 29, 2020 (KR) .................. 10-2020-0052405

(51) Int. Cl.
*B60W 60/00* (2020.01)
*B60W 30/095* (2012.01)
*B60W 40/08* (2012.01)
*B60W 50/14* (2020.01)

(52) U.S. Cl.
CPC ...... *B60W 60/0053* (2020.02); *B60W 30/095* (2013.01); *B60W 40/08* (2013.01); *B60W 50/14* (2013.01); *B60W 60/0018* (2020.02); *B60W 60/0059* (2020.02); *B60W 2050/143* (2013.01); *B60W 2520/30* (2013.01); *B60W 2540/225* (2020.02)

(58) Field of Classification Search
None
See application file for complete search history.

(56) References Cited

U.S. PATENT DOCUMENTS

| 9,975,483 | B1 | 5/2018 | Ramaswamy |
| 2017/0315556 | A1 | 11/2017 | Mimura et al. |
| 2018/0329416 | A1 | 11/2018 | Ichikawa et al. |
| 2019/0054928 | A1* | 2/2019 | Hatano ............. B60W 60/0057 |
| 2020/0004244 | A1* | 1/2020 | Mangai ................. B60W 50/14 |

OTHER PUBLICATIONS

European Search Report dated Feb. 15, 2021 from the corresponding European Application No. 20194299.2, 10 pp.

* cited by examiner

*Primary Examiner* — James J Lee
*Assistant Examiner* — Andrew Sang Kim
(74) *Attorney, Agent, or Firm* — Lempia Summerfield Katz LLC (57) ABSTRACT

A method for controlling autonomous driving in an autonomous vehicle includes: determining whether a human driver is in a forward gaze state under an autonomous driving mode, setting a first steering wheel torque threshold and a first torque holding time, based on a result of determining whether the human driver is in the forward gaze state, determining whether human driver intervention has occurred, based on the first steering wheel torque threshold and the first torque holding time, and switching the autonomous driving mode to a manual driving mode when the human driver intervention has occurred.

15 Claims, 6 Drawing Sheets

| AUTOMATION LEVEL | SAE CLASSIFICATIONS | SYSTEM ROLE | DRIVER ROLE |
|---|---|---|---|
| LEVEL 0 | NO AUTOMATION | TEMPORARY EMERGENCY INTERVENTION OR WARNING ONLY | DRIVER PERFORMS ALL DRIVING |
| LEVEL 1 | DRIVER ASSISTANCE | SYSTEM PERFORMS DRIVING FUNCTIONS, SUCH AS STEERING AND ACCELERATION/DECELERATION UNDER BOARDING OF DRIVER PERFORMING DRIVING FUNCTION IN NORMAL OPERATING MODE | DRIVER DETERMINES WHETHER AND WHEN LEVEL 1 SYSTEM IS ACTIVATED AND PERFORMS ALL DRIVING FUNCTIONS EXCEPT STEERING WHEEL OR ACCELERATION/DECELERATION PEDAL ADJUSTMENT(INCLUDING DRIVING ENVIRONMENT/VEHICLE OPERATION/LEVEL 1 SYSTEM MONITORING AND IMMEDIATE EMERGENCY PREPAREDNESS) |
| LEVEL 2 | PARTIAL AUTOMATION | PERFORMING DRIVING FUNCTIONS SUCH AS STEERING AND ACCELERATION/DECELERATION INSTEAD OF DRIVER UNDER BOARDING OF DRIVER MONITORING STEERING AND ACCELERATION/DECELERATION DEVICES | DRIVER DETERMINES WHETHER AND WHEN LEVEL 2 SYSTEM IS ACTIVATED AND PERFORMS ALL DRIVING FUNCTIONS EXCEPT STEERING WHEEL OR ACCELERATION/DECELERATION PEDAL ADJUSTMENT (INCLUDING DRIVING ENVIRONMENT/VEHICLE OPERATION/LEVEL 2 SYSTEM MONITORING AND IMMEDIATE EMERGENCY PREPAREDNESS) |
| LEVEL 3 | CONDITIONAL AUTOMATION | IN SITUATIONS BEYOND CONDITION, DRIVING CONTROL IS TRANSFERRED TO DRIVER, AND SYSTEM PERFORMS DRIVING FUNCTIONS SUCH AS STEERING AND ACCELERATION/DECELERATION | DRIVER DETERMINES WHETHER AND WHEN LEVEL 3 SYSTEM IS ACTIVATED AND PERFORMS ALL DRIVING FUNCTIONS EXCEPT STEERING WHEEL OR ACCELERATION/DECELERATION PEDAL ADJUSTMENT OR DRIVING ENVIRONMENT MONITORING (WHEN TRANSFER OF CONTROL RIGHT OF LEVEL 3 SYSTEM IS REQUESTED, DRIVER MUST RECEIVE CONTROL RIGHT AND PERFORM EMERGENCY PREPAREDNESS) |
| LEVEL 4 | HIGH AUTOMATION | SYSTEM PERFORMS ALL DRIVING FUNCTIONS UNDER BOARDING OF DRIVER IN EXTREMELY EXCEPTIONAL SITUATIONS | DRIVER OPTIONALLY PERFORMS EMERGENCY PREPAREDNESS WHEN LEVEL 4 SYSTEM REQUEST TRANSFER OF CONTROL RIGHT TO DRIVER |
| LEVEL 5 | FULL AUTOMATION | SYSTEM PERFORMS COMPLETE DRIVING FUNCTION TO RESPOND TO ANY SITUATION WITHOUT DRIVER | DRIVER ONLY MONITORS WHETHER SYSTEM IS WORKING AND DOES NOT PERFORM ALL DRIVING FUNCTIONS |

AUTONOMOUS DRIVING CONTROL METHOD AND DEVICE

CROSS-REFERENCE TO RELATED APPLICATION

This application claims priority to and the benefit of Korean Patent Application No. 10-2020-0052405, filed on Apr. 29, 2020, the entire contents of which are incorporated herein by reference.

FIELD

The present disclosure relates to an autonomous vehicle control, and more particularly, a scheme for outputting a transition demand warning alarm for a right to control an autonomous vehicle.

BACKGROUND

The statements in this section merely provide background information related to the present disclosure and may not constitute prior art.

An autonomous vehicle requires an ability to adaptively cope with a surrounding situation changing in real time while the vehicle is driving.

For production and popularity of the autonomous vehicle, a reliable determination control function is required.

In an autonomous driving system of a level 2 that is currently being produced, the human driver is required to look ahead. Thus, when the human driver does not grip a steering wheel, a predetermined handoff warning alarm is output. Whether the human driver is involved in steering is determined based on change in a steering torque value according to steering wheel manipulation of the human driver.

In a level 3 based autonomous vehicle, when it is determined that a right to control handover from the autonomous system to the human driver is required while the autonomous driving system is activated, a TD (transition demand) warning alarm may be output.

When the human driver intervention is confirmed after outputting of the TD warning alarm, the autonomous vehicle determines that the human driver receives the right to control handover, and is ready for manual driving and turn offs the autonomous driving system.

However, the level 3 based autonomous vehicle allows handoff of the human driver during autonomous driving. When the human driver accidentally manipulates the steering wheel, the level 3 based autonomous vehicle incorrectly determines this accidental manipulation as intentional intervention for receiving the right to control.

This may increase a risk of an accident because the autonomous driving system is deactivated when the human driver is not ready for manual driving.

SUMMARY

An aspect of the present disclosure provides a method and a device for controlling autonomous driving.

Another aspect of the present disclosure provides an autonomous driving control method and an autonomous driving control device for accurately determining whether the human driver intervention has occurred after outputting a transition demand warning alarm for a right to control handover from an autonomous driving system to a human driver.

Another aspect of the present disclosure provides an autonomous driving control method and an autonomous driving control device capable of dynamically changing a threshold torque value and a steering intervention time for determining the human driver intervention based on a forward gaze state determination result of the human driver.

Another aspect of the present disclosure provides an autonomous driving control method and an autonomous driving control device capable of accurately and quickly determining the human driver intervention for receiving a right to control handover in an autonomous vehicle of a SAE (Society of Automotive Engineers) level 3.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for controlling autonomous driving in an autonomous vehicle includes determining whether a human driver is in a forward gaze state under an autonomous driving mode, setting a first steering wheel torque threshold and a first torque holding time, based on a result of determining whether the human driver is in the forward gaze state, determining whether human driver intervention has occurred, based on the first steering wheel torque threshold and the first torque holding time, and switching the autonomous driving mode to a manual driving mode when the human driver intervention has occurred.

In one form, the method may further include determining whether a warning alarm for a right to control handover request is required under the autonomous driving mode, activating a minimal risk maneuver (MRM) driving mode and maintaining the autonomous driving mode when the warning alarm is required, determining whether the human driver is in the forward gaze state under the minimal risk maneuver (MRM) driving mode, and setting a second steering wheel torque threshold and a second torque holding time varying based on a level of the human driver forward gaze.

In one form, the autonomous driving mode maintained after the activation of the minimal risk maneuver (MRM) driving mode may include a deceleration mode while a current lane is maintained.

In one form, the first steering wheel torque threshold corresponding to the forward gaze state of the human driver may be set to be smaller than the first steering wheel torque threshold corresponding to a non-forward gaze state of the human driver.

In one form, the first torque holding time corresponding to the forward gaze state of the human driver may be set to be smaller than the first torque holding time corresponding to the non-forward gaze state of the human driver.

In one form, the first steering wheel torque threshold may be set to be greater than the second steering wheel torque threshold.

In one form, the first torque holding time may be set to be larger than the second torque holding time.

In one form, after the minimal risk maneuver (MRM) driving mode is activated, the warning alarm is output, wherein upon determination, based on the second steering wheel torque threshold and the second torque holding time, that the human driver intervention has occurred, the outputting of the warning alarm is deactivated and the vehicle operates in the manual driving mode.

In one form, a condition for determining whether the human driver is in the forward gaze state may vary depending on a dangerous situation detected during the autonomous driving mode.

In one form, the determining of whether the human driver is in the forward gaze state may include determining a gaze toward a front windshield as the forward gaze in a risk of forward collision, determining a gaze toward a left collision direction as the forward gaze in a risk of left collision, and determining a gaze toward a right collision direction as the forward gaze in a risk of right collision.

According to another aspect of the present disclosure, a device for controlling autonomous driving in an autonomous vehicle includes an autonomous driving controller to control autonomous driving, and a human driver gaze detector to determine whether a human driver is in a forward gaze state during the autonomous driving, wherein the autonomous driving controller includes a right to control handover determiner for determining whether a warning alarm for a right to control handover is desired during the autonomous driving, a control command generator for setting a first steering wheel torque threshold and a first torque holding time based on the determination result about whether the human driver in the forward gaze state, and a human driver intervention determiner for determining whether human driver intervention has occurred, based on the first steering wheel torque threshold and the first torque holding time, wherein when the human driver intervention has occurred, the control command generator switches an autonomous driving mode to a manual driving mode.

In one form, the control command generator may activate a minimal risk maneuver (MRM) driving mode and maintain the autonomous driving mode when the warning alarm is output, and set a second steering wheel torque threshold and a second torque holding time varying based on a level of the human driver forward gaze, under the minimal risk maneuver (MRM) driving mode.

In one form, the autonomous driving mode maintained after the activation of the minimal risk maneuver (MRM) driving mode may include a deceleration mode while a current lane is maintained.

In one form, the first steering wheel torque threshold corresponding to the forward gaze state of the human driver may be set to be smaller than the first steering wheel torque threshold corresponding to a non-forward gaze state of the human driver.

In one form, the first torque holding time corresponding to the forward gaze state of the human driver may be set to be smaller than the first torque holding time corresponding to the non-forward gaze state of the human driver.

In one form, the first steering wheel torque threshold may be set to be greater than the second steering wheel torque threshold.

In one form, the first torque holding time may be set to be larger than the second torque holding time.

In one form, the device may further include a warning alarm generator for outputting the warning alarm after the activation of the minimal risk maneuver (MRM) driving mode, wherein upon determination, based on the second steering wheel torque threshold and the second torque holding time, that the human driver intervention has occurred, the control command generator may deactivate the outputting of the warning alarm and may activate the manual driving mode.

In one form, a condition for determining whether the human driver is in the forward gaze state may vary depending on a dangerous situation detected during the autonomous driving mode.

In one form, the human driver gaze detector may determine a gaze toward a front windshield as the forward gaze in a risk of forward collision, determine a gaze toward a left collision direction as the forward gaze in a risk of left collision, and determine a gaze toward a right collision direction as the forward gaze in a risk of right collision.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a table in which an automation level of an autonomous vehicle is defined;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. It should be noted that in adding reference numerals to components of the drawings, the same or equivalent components are designated by the same numeral even when they are present on different drawings. Further, in describing exemplary forms of the present disclosure, a detailed description of a related known component or function will be omitted when it is determined that the description interferes with understanding of the form of the present disclosure.

In describing components of one form of the present disclosure, tams such as first, second, A, B, (a), (b), and the like may be used. These terms are merely intended to distinguish between the components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, forms of the present disclosure will be described in detail with reference to FIG. 1 to FIG. 6.

FIG. 1 is a table in which an automation level of an autonomous vehicle is defined in one form of the present disclosure.

An autonomous vehicle means a vehicle driving by itself while determining a danger by recognizing a driving environment of the vehicle and thus controlling a driving route in order to avoid the danger, thereby minimizing driving manipulation of the human driver.

Ultimately, an autonomous vehicle means a vehicle capable of driving, steering, and parking without human influence. Autonomous driving as a core technique of the autonomous vehicle refers to an ability to drive the vehicle without active control or monitoring of the human driver. The ability is currently increasingly advanced.

However, a concept of a current autonomous vehicle may include a middle automation level, as shown in FIG. 1 which advances to a full-autonomous level and may correspond to a goal-oriented concept targeting production and commercialization of a fully autonomous vehicle.

The autonomous driving control method according to the present disclosure may be applied to an autonomous vehicle corresponding to a level 3 (conditional autonomous driving) among automation levels of an autonomous driving system shown in FIG. 1, but may not be limited thereto and may also be applied to other levels of autonomous vehicles where a right to control handover situation may occur.

The automation levels of the autonomous vehicle based on SAE (Society of Automotive Engineers may be classified as shown in the table of FIG. 1.

Figure 2:
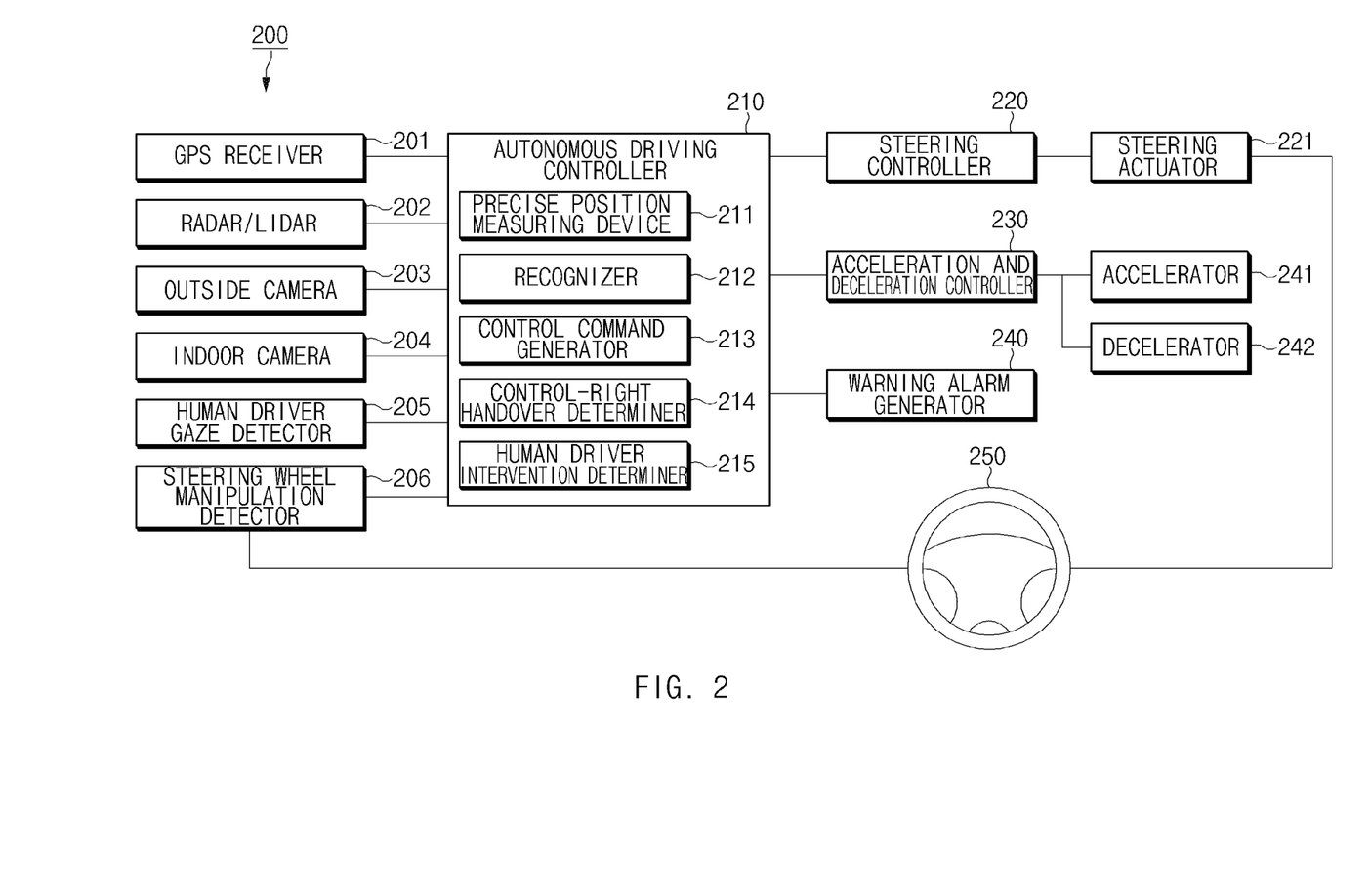
FIG. 2 is a block diagram for illustrating a structure of an autonomous driving control device in one form of the present disclosure.

FIG. 2 is a block diagram for illustrating a structure of an autonomous driving control device according to one form of the present disclosure.

Referring to FIG. 2, an autonomous driving control device 200 may include a GPS receiver 201, a radar/lidar 202, an outside camera 203, an indoor camera 204, a human driver gaze detector 205, a steering wheel manipulation detector 206, an autonomous driving controller 210, a steering controller 220, a steering actuator 221, an acceleration and deceleration controller 230, an accelerator 241, a decelerator 242, a warning alarm generator 240, and a steering wheel 250.

The autonomous driving controller 210 may be configured to include a precise position measuring device 211, a recognizer 212, a control command generator 213, a right to control handover determiner 214, and a human driver intervention determiner 215.

All of the components of the autonomous driving control device 200 shown in FIG. 2 may not necessarily be essential components, and thus more or fewer components may be included therein.

The GPS receiver 201 may receive a position signal from a position measuring satellite.

The radar/lidar 202 may detect objects around the vehicle. The radar/lidar 202 may detect objects in front, side and rear of the vehicle, and may calculate a distance to the detected object, and may distinguish whether the detected object is a static object or a dynamic object, and may measure a moving speed of the detected dynamic object, and may distinguish whether the detected dynamic object is a pedestrian or a vehicle, and may identify a condition of a road and facilities via a high resolution terrain scan.

The outside camera 203 may be mounted on an outside of the vehicle to photograph front, side, and rear images of the vehicle. To this end, a plurality of outside cameras 203 may be provided on the vehicle. The image captured by the outside camera 203 may be used for purposes such as line identification, object identification around the vehicle, and augmented reality.

The indoor camera 204 may be mounted on an inner side of the vehicle to take a picture of the human driver.

The image photographed by the indoor camera 204 may be used for monitoring a gaze direction of the human driver, drowsiness of the human driver, and the like.

The human driver gaze detector 205 may detect the gaze direction of the human driver by analyzing the image taken by the indoor camera 204 based on a control signal of the autonomous driving controller 210.

According to one form, the human driver gaze detector 205 may adaptively determine a forward gaze of the human driver according to a situation.

In an example, a warning alarm, that is, a TD message to request a right to control handover from the system to the human driver due to a forward driving problem during autonomous driving, for example, including a dangerous situation such as appearance of pedestrians/wild animals and obstacle detection in front of the vehicle may be output. When the human driver gaze is looking at a front windshield when the alarm is output, the human driver gaze detector 205 may determine this gaze as the forward gaze.

In another example, when the right to control handover warning occurs due to cut-in of another vehicle from a right lane during autonomous driving, the human driver recognizes another vehicle cutting-in from a right side through a windshield. To this end, the gaze direction of the driver is right. Thus, the human driver gaze detector 205 may determine this gaze in the right direction of the human driver as the forward gaze.

In another example, when the right to control handover warning occurs due to cut-in of another vehicle from a left lane during autonomous driving, the human driver recognizes another vehicle cutting-in from a left side through a windshield. To this end, the gaze direction of the driver is left. Thus, the human driver gaze detector 205 may determine this gaze in the left direction of the human driver as the forward gaze.

The steering wheel manipulation detector 206 may detect whether the steering wheel 250 has been manipulated by the human driver.

For example, the steering wheel 250 may be provided with a touch sensor capable of detecting a gripping state of the steering wheel 250 by the human driver. In this case, the steering wheel manipulation detector 206 may determine whether the human driver has manipulated the steering wheel 250 based on the sensing information of the touch sensor.

In another example, the steering wheel manipulation detector 206 may detect change in torque of the steering wheel 250. When the steering wheel manipulation detector 206 detects a torque change of the steering wheel 250 to a value above a predetermined reference value, it may be determined that the human driver has manipulated the steering wheel 250.

However, it is desired to distinguish whether the steering wheel manipulation by the human driver is intentional or inadvertent.

When the steering wheel manipulation by the human driver is detected, the human driver intervention determiner 215 may determine whether the steering wheel manipulation is intentional or inadvertent and thus determine whether the steering wheel manipulation is aimed at the human driver intervention to receive the right to control handover.

A method for determining whether the human driver intervention is intentional or inadvertent will be clearer via the description of the drawings to be described later.

The precise position measuring device 211 may determine a current position of the vehicle using a position signal from the GPS receiver 201 and pre-stored precise map information, and may map the determined current position of the vehicle on the precise map.

The recognizer 212 may recognize lanes based on sensing information from the radar/lidar 202 and the image information taken by the outside camera 203, and may identify another vehicle driving on the lanes, obstacles surrounding the vehicle, pedestrians around the vehicle, etc.

The control command generator 213 may calculate a request command value based on the recognition result of the recognizer 212, and may transmit a predetermined control signal corresponding to the calculated command value to the steering controller 220 and the acceleration and deceleration controller 230.

The control command generator 213 may dynamically set a steering wheel torque threshold and a torque holding time based on the determination result about whether the human driver is in a forward gaze state.

The right to control handover determiner 214 may determine whether right to control handover from the system to the human driver is desired, based on the recognition result of the recognizer 212, the vehicle internal state, and the like.

When, based on a result of the determination, the right to control handover is desired, the right to control handover determiner 214 may transmit a predetermined control signal to the warning alarm generator 240 to output a predetermined warning alarm message requesting the right to control handover to the human driver.

The human driver intervention determiner 215 may determine whether the human driver intervention has occurred, based on the steering wheel torque threshold and the torque holding time.

When it is determined that the human driver intervention has occurred, the control command generator 213 may switch an autonomous driving mode to a manual driving mode and may handover the right to control to the human driver.

The human driver intervention determiner 215 may apply different conditions for determining whether the human driver intervention has occurred, depending on whether the warning alarm message is output. For example, when the warning alarm message is output, the human driver intervention determiner 215 may be configured to allow faster and more accurate right to control handover.

Details about the method of determine whether the human driver intervention has occurred, based on whether or not the warning alarm message is output will become clearer via the descriptions of FIG. 3 to FIG. 6 to be described later.

The steering controller 220 is responsible for left-right movement of the autonomous vehicle. The steering controller 220 may control the steering actuator 221 based on a left-right movement control request command value transmitted from the control command generator 213 of the autonomous driving controller 210.

In this connection, the steering actuator 221 may include an actuator for the right-left movement of the vehicle.

The acceleration and deceleration controller 230 is in charge of a forward movement of the autonomous vehicle. The acceleration and deceleration controller 230 may control the accelerator 241 and/or the decelerator 242 based on the forward movement control request command value transmitted from the control command generator 213 of the autonomous driving controller 210. In this connection, the accelerator 241 includes accelerating means. The decelerator 242 may include a brake.

The warning alarm generator 240 may output the warning alarm message for the right to control handover, that is, the TD (transition demand) message. The human driver may receive the right to control handover according to the right to control handover requesting warning alarm in the autonomous driving mode and may drive the vehicle in the manual driving mode.

Figure 3:
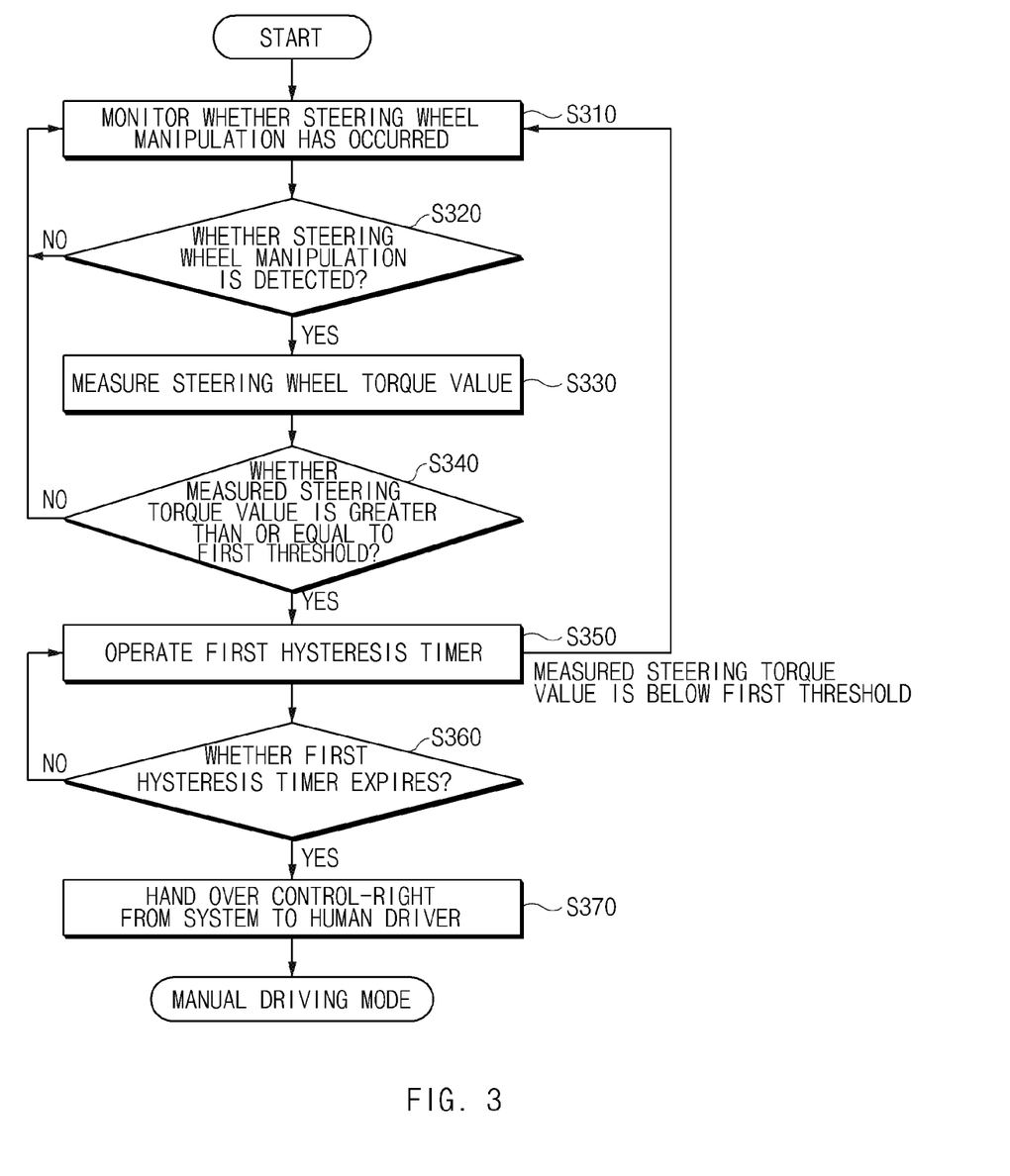
FIG. 3 is a flowchart for illustrating an autonomous driving control method in one form of the present disclosure.

FIG. 3 is a flowchart for illustrating an autonomous driving control method according to one form of the present disclosure.

In detail, FIG. 3 is a flowchart for illustrating a method of determining whether the human driver intervention has occurred during autonomous driving, and transferring the right to control from the system to the human driver based on the determination result.

When the human driver intervention during autonomous driving has occurred, the autonomous driving system should handover the right to control from the system to the human driver.

However, the human driver may accidentally manipulate the steering wheel. In this case, when the right to control is automatically handed over from the system to the human driver, the risk of an accident increases.

Therefore, determining whether the steering wheel is manipulated accidentally or intentionally during autonomous driving is an important factor for securing reliability of the autonomous driving system.

Referring to FIG. 3, the device 200 may monitor whether the steering wheel manipulation has occurred during operation of the vehicle in the autonomous driving mode (S310).

When the steering wheel manipulation is detected, the device 200 may start to measure the steering wheel torque value (S320).

For example, the device 200 may detect the steering wheel gripping operation of the human driver via the touch sensor provided on one side of the steering wheel and may determine whether the manipulation of the steering wheel by the human driver has occurred based on the detection result.

In another example, the device 200 may determine whether the manipulation of the steering wheel by the human driver has occurred, based on detected change in the steering torque value.

The device 200 may start to measure the steering wheel torque value when the steering wheel manipulation is detected (S330).

The device 200 may determine whether the measured steering torque value is greater than or equal to a first threshold (S340).

When, based on a result of the determination, the measured steering torque value is greater than or equal to a first threshold, the device 200 may operate a first hysteresis timer (S350).

When the first hysteresis timer expires, the device 200 may handover the right to control from the system to the human driver and may activate the manual driving mode (S360 to S370).

When, at S350, the steering wheel torque value measured during the operation time of the first hysteresis timer is below the first threshold, the device 200 may stop operating the first hysteresis timer, and S310 may be performed.

As in the form of FIG. 3, the device 200 may determine that the human driver intervention has occurred only when the human driver manipulates the steering wheel by applying a force equal to or above a predetermined threshold torque value for a predefined period of time.

Figure 4:
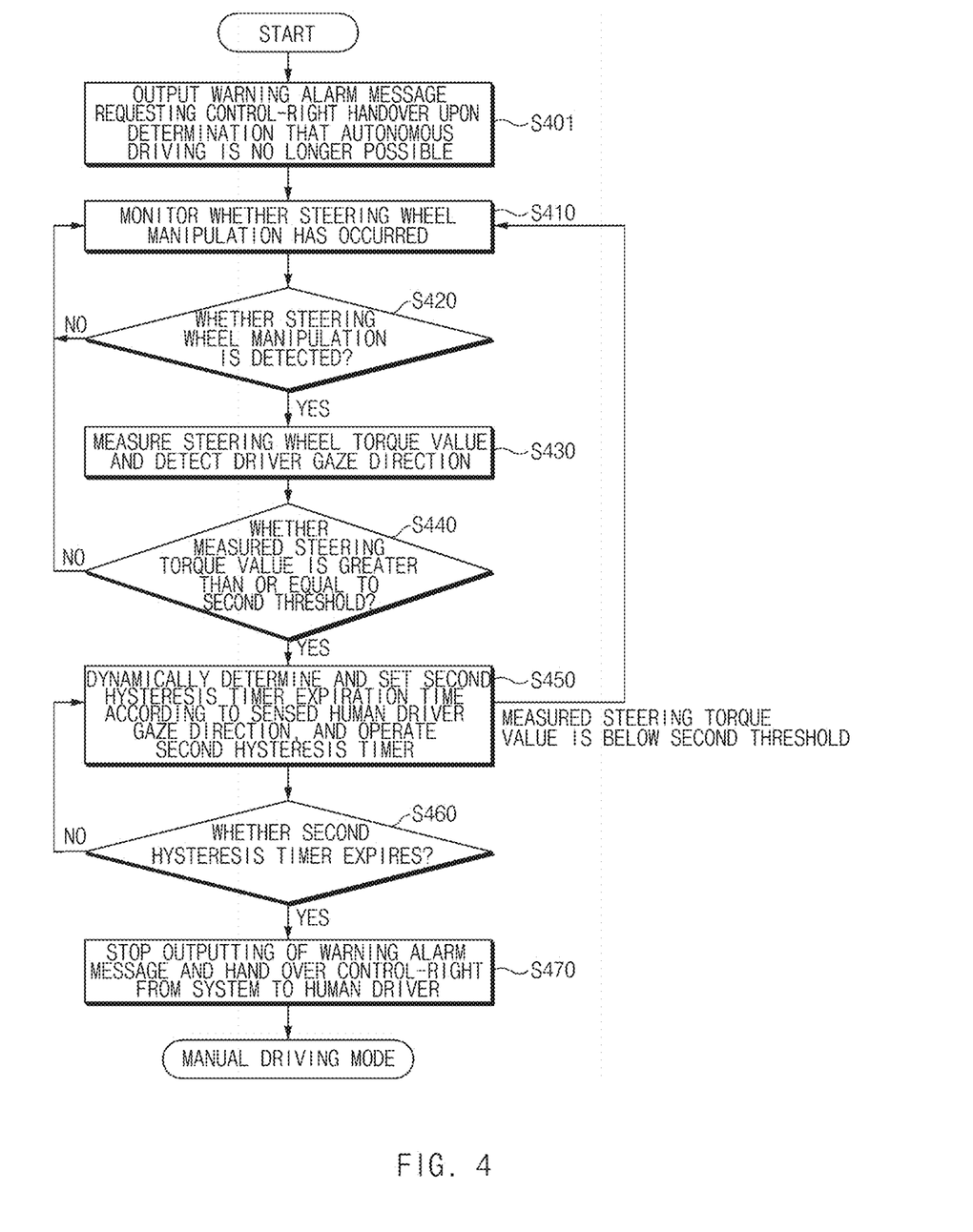
FIG. 4 is a flowchart for illustrating an autonomous driving control method according to another form of the present disclosure.

FIG. 4 is a flowchart for illustrating an autonomous driving control method according to another form of the present disclosure.

In detail, FIG. 4 is a flowchart for illustrating a method for outputting a transition demand (TD) warning alarm for the right to control handover during autonomous driving, determining whether the human driver intervention has occurred, and then handing over the right to control from the system to the human driver based on the determination result.

The human driver intervention determination after the TD situation occurs during autonomous driving needs to be performed more accurately and faster than the human driver intervention determination in a normal autonomous driving situation.

When the right to control handover is delayed even in the human driver intervention event at the TD situation, a risk of accident may increase.

Referring to FIG. 4, the device 200 may monitor whether the steering wheel manipulation has occurred during operation of the vehicle in an autonomous driving mode (S310).

When the steering wheel manipulation is detected, the device 200 may start the measurement of the steering wheel torque value (S320).

For example, the device 200 may detect the steering wheel gripping operation of the human driver via the touch sensor provided on one side of the steering wheel and may determine whether the manipulation of the steering wheel by the human driver has occurred based on the detection result.

In another example, the device 200 may output the warning alarm message requesting the right to control handover upon the determination that autonomous driving is no longer possible during autonomous driving (S401).

The device 200 may monitor the steering wheel manipulation in the outputted state of the warning alarm message (S410).

When, based on a result of the monitoring, the steering wheel manipulation is detected, the device 200 starts measuring the steering wheel torque value, and may detect the human driver gaze direction (S420 to S430).

The device 200 may determine whether the measured steering torque value is greater than or equal to a second threshold (S440). In this connection, the second threshold may vary according to a gaze direction of the human driver. For example, the second threshold corresponding to when the gaze of the human driver is a forward gaze may be set to a value smaller than the second threshold corresponding to when the gaze of the human driver is not the forward gaze.

When, based on a result of the determination, the measured steering torque value is greater than or equal to the second threshold, the device 200 may dynamically determine and set a second hysteresis timer expiration time according to the sensed human driver gaze direction, and then may operate the second hysteresis timer (S450).

For example, the expiration time of the second hysteresis timer when the gaze of the human driver is a forward gaze is set to be smaller than the expiration time of the second hysteresis timer when the gaze of the human driver is not a forward gaze.

When the second hysteresis timer expires, the device 200 may stop the outputting of the warning alarm message and may hand over the right to control from the system to the human driver, and may operate the vehicle in a manual driving mode (S460 to S470).

At S450, when the steering wheel torque value measured during the operation time of the second hysteresis timer is below the second threshold, the device 200 stops operating the second hysteresis timer, and S410 may be performed.

As in the form of FIG. 4, the device 200 may determine that the human driver intervention has occurred only when the human driver manipulates the steering wheel by applying a force equal to or above a predetermined threshold torque value for a predefined period of time after the TD situation occurs. In this connection, the device 200 may dynamically determine the second threshold value and the second hysteresis timer expiration time in consideration of the gaze direction of the human driver, that is, a level of the forward gaze of the human driver.

For example, the first threshold in FIG. 3 may be set to a value greater than the second threshold in FIG. 4.

For example, the expiration time of the first hysteresis timer in FIG. 3 may be set to be larger than the expiration time of the second hysteresis timer in FIG. 4.

As described above, the device 200 according to the present disclosure may determine whether the human driver intervention has occurred in consideration of following three factors:

A first factor may be a driver gaze. The device 200 may determine whether the human driver is in the forward gaze state based on the detecting result of the human driver gaze.

The second factor may be a steering wheel torque value due to the manipulation of the human driver. The device 200 may determine the left-right manipulation of the steering wheel by the human driver based on an amount of the torque by which the human driver exerts on the steering wheel.

The third factor may be a time duration for which the human driver applies a torque above a threshold to the steering wheel. The device 200 may determine whether the manipulation of the human driver is intentional or inadvertent depending on how long the human driver applies the torque to the steering wheel.

The device 200 according to the present disclosure may determine whether the human driver intervention has occurred based on a combination of at least two of the three factors.

Figure 5:
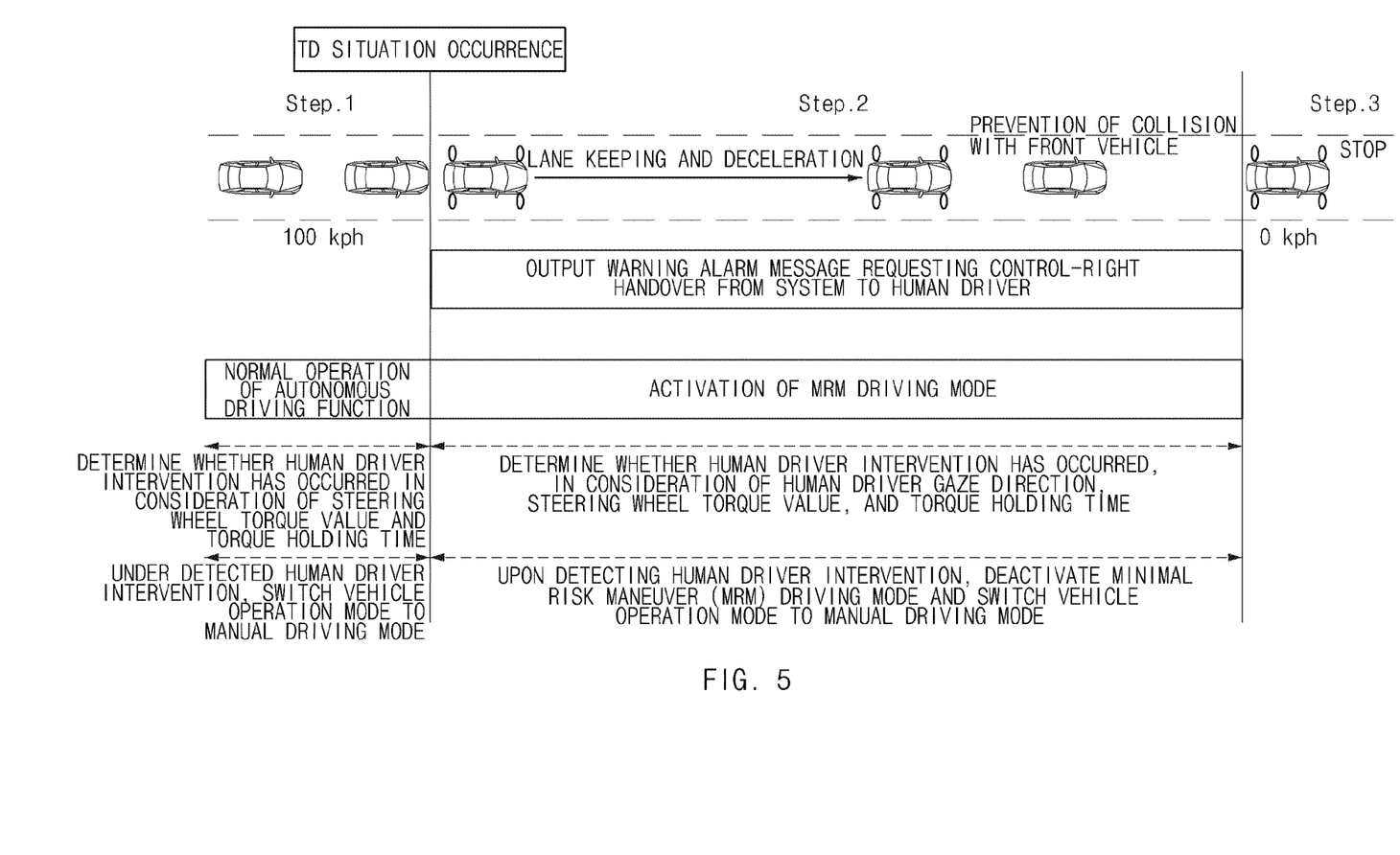
FIG. 5 is a view for illustrating an autonomous driving control method based on whether TD occurs in an autonomous driving control device according to an form of the present disclosure.

FIG. 5 is a view for illustrating an autonomous driving control method based on whether TD has occurred, by the autonomous driving control device according to one form of the present disclosure.

Referring to FIG. 5, when the autonomous driving function is activated, the device 200 may perform autonomous driving control based on a request command from the autonomous driving controller 210.

The device 200 may determine whether the human driver intervention has occurred in consideration of the steering wheel torque value and the torque holding time under the normal operation of the autonomous driving system.

When the human driver intervention is detected under the normal operation state of the autonomous driving system, the device 200 may switch a vehicle operation mode to the manual driving mode.

When the TD situation occurs during the autonomous driving, the device 200 may activate the minimal risk maneuver (MRM) driving mode and may output a warning alarm message requesting the right to control handover from the system to the human driver.

In this connection, the TD situation means a situation in which the autonomous driving mode cannot be maintained, and may include situations such as cutting-in of another vehicle, appearance of pedestrians or wild animals in front of a vehicle, obstacle detection in front thereof, sudden stop of a front vehicle, and deterioration of weather, but is not limited thereto. The TD situation may include vehicle controller failure, vehicle communication failure, fuel shortage, and the like.

When the minimal risk maneuver (MRM) driving mode is activated, the device 200 may perform deceleration control while a current lane is kept according to a request command value of the autonomous driving controller 210 until the vehicle is completely stopped.

The device 200 may determine whether the human driver intervention has occurred under the minimal risk maneuver (MRM) driving mode, in consideration of the human driver gaze direction, the steering wheel torque value, and the torque holding time.

When the device 200 detects the human driver intervention under the minimal risk maneuver (MRM) driving mode, the device 200 may deactivate the minimal risk maneuver (MRM) driving mode and may switch a vehicle operation mode to the manual driving mode.

When the right to control handover due to the detection of the human driver intervention under the minimal risk maneuver (MRM) driving mode is normally completed, the device 200 may stop outputting the warning alarm message.

Figure 6:
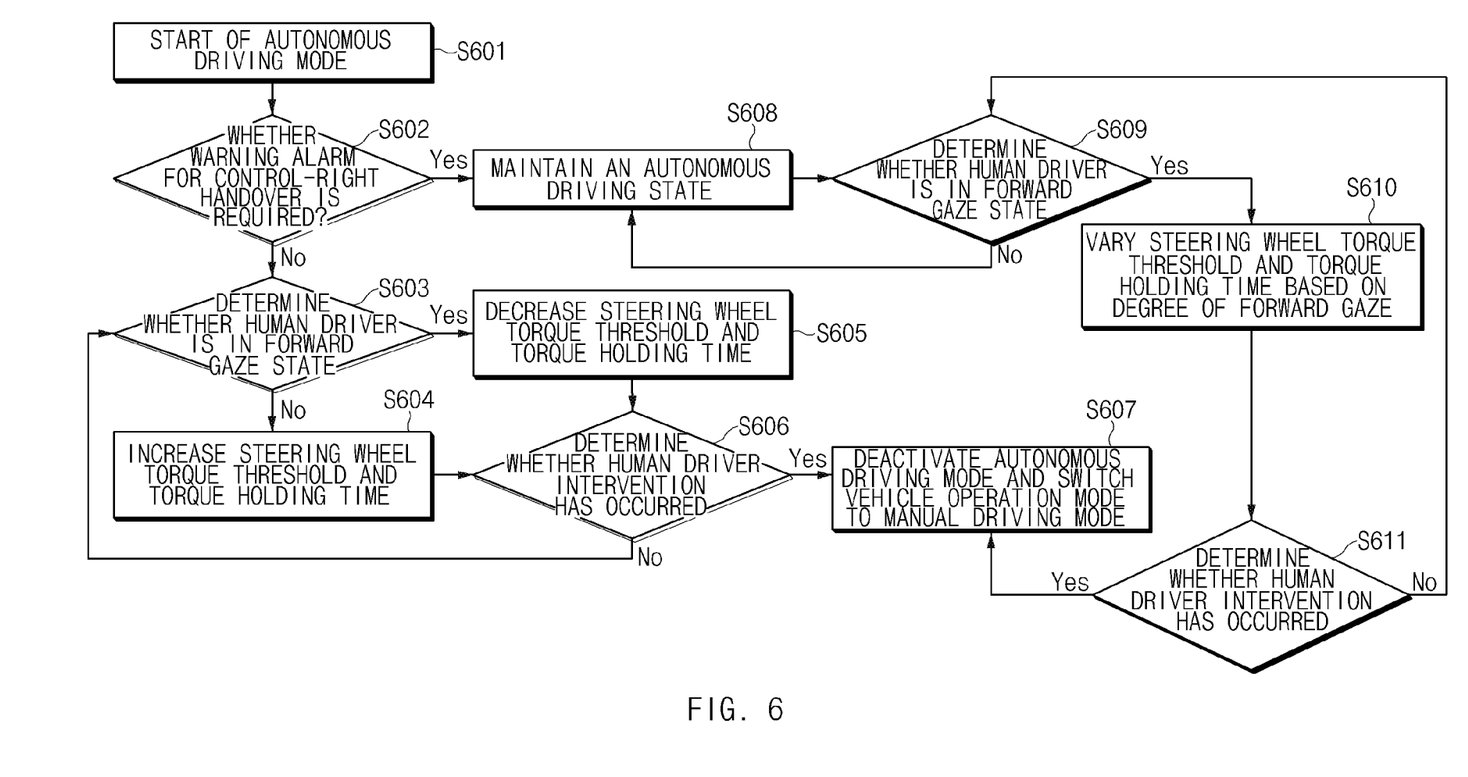
FIG. 6 is a flowchart for illustrating an autonomous driving control method according to another form of the present disclosure.

FIG. 6 is a flowchart for illustrating an autonomous driving control method according to another form of the present disclosure.

Referring to FIG. 6, the device 200 may determine whether the warning alarm for the right to control handover is desired under the autonomous driving mode (S601 to S602).

When, based on a result of the determination, the warning alarm is not required, the device 200 may determine whether the human driver is in the forward gaze state (S603).

When, based on a result of the determination, the human driver is not in the forward gaze state, the device 200 may set the steering wheel torque threshold to a first value, and may set the torque holding time, that is, the hysteresis timer expiration time to a second time (S604).

When, based on a result of the determination at S603, the human driver is in the forward gaze state, the device 200 may set the steering wheel torque threshold to a third value and the torque holding time to a fourth time (S605).

In this connection, the device 200 may set the first value to a value greater than the third value, and may set the second time to be larger than the fourth time.

Subsequently, the device 200 may determine whether the human driver intervention has occurred (S606).

When the human driver intervention has occurred during normal driving of the autonomous driving system, the device 200 deactivates the autonomous driving mode and switches the vehicle operation mode to the manual driving mode.

When, based on the result of the determination at S606, there is no human driver intervention, the device 200 may perform S603, such that the human driver forward gaze may be monitored.

When the warning alarm is required at S602 as described above, that is, a dangerous situation is detected during autonomous driving, the device 200 maintains an autonomous driving state, and determines whether the human driver is in the forward gaze state (S608 to S609). In this case, the autonomous driving is based on the minimal risk maneuver (MRM) driving mode. At this time, deceleration may be conducted while the current lane is kept. However, the present disclosure is not limited thereto. Depending on the situation, the vehicle is decelerated and stops at a shoulder.

When, based on a result of the determination, the human driver is not in the forward gaze state, the device 200 maintains an autonomous driving state. Otherwise, when the human driver is in the forward gaze state, the device 200 may vary the steering wheel torque threshold and the torque holding time based on the level of the forward gaze and then determine whether the human driver intervention has occurred (S610 to 611).

When the human driver intervention has occurred at S611, the device 200 may perform S607. Otherwise, when the human driver intervention has not occurred, the device 200 may proceed to S609, such that the human driver forward gaze state may be monitored.

In one form, the forward gaze determination of the human driver may be made adaptively as follows according to a detected dangerous situation.

1. Regarding a risk of forward collision, a gaze toward the front windshield is determined as the forward gaze.
2. Regarding a risk of left collision, a gaze toward a left collision direction is determined as the forward gaze.
3. Regarding a risk of right collision, a gaze toward a right collision direction is determined as the forward gaze.

According to the present disclosure, varying the threshold torque value and the steering intervention time (i.e., the torque holding time or the hysteresis timer expiration time) related to the steering wheel manipulation by the human driver based on the human driver forward gaze determination result may allow a safer and more accurate scheme to determine the human driver intervention during autonomous driving.

The operations of the method or the algorithm described in connection with the forms disclosed herein may be embodied directly in a hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM.

The exemplary storage medium is coupled to the processor which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The form of the present disclosure has an advantage of providing the autonomous driving control method and the autonomous driving control method device.

In addition, the present disclosure has an advantage of providing an autonomous driving control method and an autonomous driving control device capable of more accurately determining the human driver intervention after outputting the transition demand (TD) warning alarm for the right to control handover.

In addition, the present disclosure has an advantage of providing an autonomous driving control method and an autonomous driving control device capable of dynamically changing the threshold torque value and the steering intervention time for determining the human driver intervention according to the forward gaze state determination result of the human driver, and thus determining the human driver intervention after the TD occurrence, based on the changed value and time.

In addition, the present disclosure has an advantage of providing an autonomous driving control method and an autonomous driving control device capable of accurately and quickly determining the human driver intervention for the right to control handover in the SAE (Society of Automotive Engineers) level 3 based autonomous vehicle.

In addition, various effects that may be directly or indirectly identified based on the disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A method for controlling autonomous driving in an autonomous vehicle, the method comprising:
    determining, by a human driver gaze detector, whether a human driver is in a forward gaze state under an autonomous driving mode;
    determining, by a control command generator, a first steering wheel torque threshold and a first torque holding time, based on a result of determining whether the human driver is in the forward gaze state;
    determining, by a human driver intervention determiner, whether human driver intervention has occurred, based on the first steering wheel torque threshold and the first torque holding time;
    switching, by the control command generator, the autonomous driving mode to a manual driving mode upon determination that the human driver intervention has occurred;
    determining, by a right to control handover determiner, whether a warning alarm for a right to control handover request is required under the autonomous driving mode;
    activating, by the control command generator, a minimal risk maneuver (MRM) driving mode and maintaining the MRM driving mode when the warning alarm is required;
    determining, by the human driver gaze detector, whether the human driver is in the forward gaze state under the MRM driving mode; and
    varying, by the control command generator, a second steering wheel torque threshold and a second torque holding time based on a level of the forward gaze state of the human driver under the MRM driving mode,
    wherein the first steering wheel torque threshold in the forward gaze state of the human driver is set to be less than the first steering wheel torque threshold in a non-forward gaze state of the human driver.

2. The method of claim 1, wherein the autonomous driving mode maintained after activating the MRM driving mode includes a deceleration mode while a current lane is maintained.

3. The method of claim 1, wherein the first steering wheel torque threshold is set to be greater than the second steering wheel torque threshold.

4. The method of claim 3, wherein the first torque holding time is set to be larger than the second torque holding time.

5. The method of claim 1, wherein after the MRM driving mode is activated, the warning alarm is output,
    wherein when the human driver intervention has occurred, the outputting of the warning alarm is deactivated and the vehicle operates in the manual driving mode.

6. The method of claim 1, wherein the first torque holding time in the forward gaze state of the human driver is set to be less than the first torque holding time in the non-forward gaze state of the human driver.

7. The method of claim 1, wherein a condition for determining whether the human driver is in the forward gaze state varies based on a dangerous situation detected during the autonomous driving mode.

8. The method of claim 7, wherein determining whether the human driver is in the forward gaze state includes:
    determining a gaze toward a front windshield as a forward gaze of the human driver in a risk of forward collision;
    determining a gaze toward a left collision direction as the forward gaze in a risk of left collision; and
    determining a gaze toward a right collision direction as the forward gaze in a risk of right collision.

9. A device for controlling autonomous driving in an autonomous vehicle, the device comprising:
    a processor; and
    a non-transitory storage medium containing program instructions that, when executed by the processor, causes an autonomous driving controller to:
    control autonomous driving;
    determine whether a warning alarm for a right to control handover is required during the autonomous driving;
    determine a first steering wheel torque threshold and a first torque holding time based on a determination result about whether a human driver is in a forward gaze state;
    determine whether human driver intervention has occurred, based on the first steering wheel torque threshold and the first torque holding time; and
    switch an autonomous driving mode to a manual driving mode when the human driver intervention has occurred,
    wherein the program instructions when executed are configured to:
    activate a minimal risk maneuver (MRM) driving mode and maintain the MRM driving mode when the warning alarm is required; and
    vary a second steering wheel torque threshold and a second torque holding time based on a level of the forward gaze state of the human driver under the MRM driving mode, and
    wherein the first steering wheel torque threshold corresponding to the forward gaze state of the human driver is set to be less than the first steering wheel torque threshold corresponding to a non-forward gaze state of the human driver.

10. The device of claim 9, wherein the autonomous driving mode maintained after activating the MRM driving mode includes a deceleration mode while a current lane is maintained.

11. The device of claim 9, wherein the first steering wheel torque threshold is set to be greater than the second steering wheel torque threshold.

12. The device of claim 11, wherein the first torque holding time is set to be larger than the second torque holding time.

13. The device of claim 9, wherein the first torque holding time corresponding to the forward gaze state of the human driver is set to be less than the first torque holding time corresponding to the non-forward gaze state of the human driver.

14. The device of claim 9, wherein a condition for determining whether the human driver is in the forward gaze state varies based on a dangerous situation detected during the autonomous driving mode.

15. The device of claim 14, wherein the condition for determining whether the human driver is in the forward gaze state includes:
- when a risk of forward collision occurs, a gaze of the driver toward a front windshield is determined as the forward gaze;
- when a risk of left collision occurs, a gaze of the driver toward a left collision direction is determined as the forward gaze; and
- when a risk of right collision occurs, a gaze of the driver toward a right collision direction is determined as the forward gaze.

* * * * *